May 24, 1932.  H. H. LOGAN  1,860,108
SHOCK ABSORBER
Filed Dec. 6, 1928  2 Sheets-Sheet 1
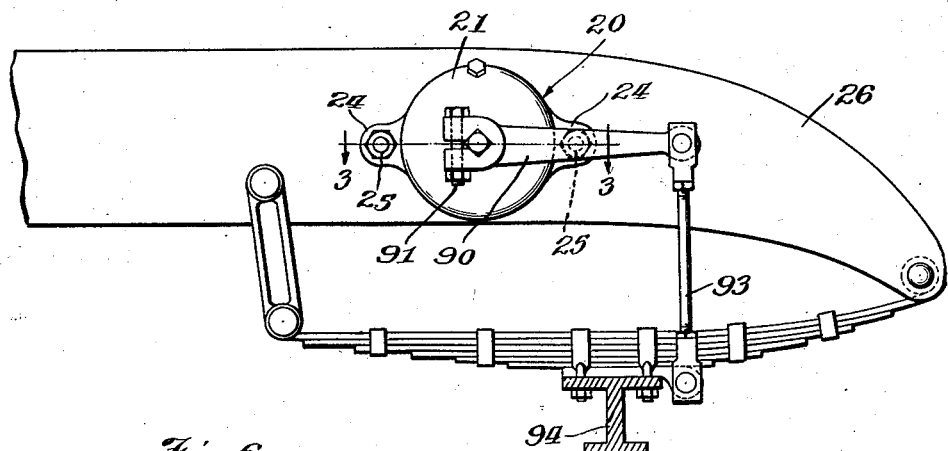
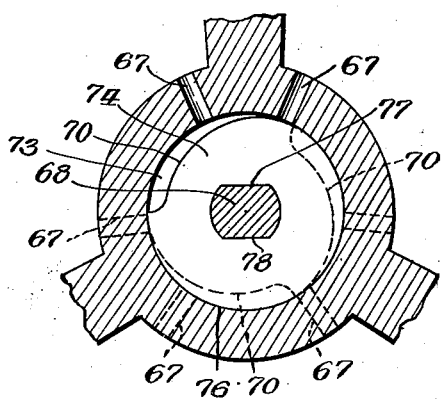
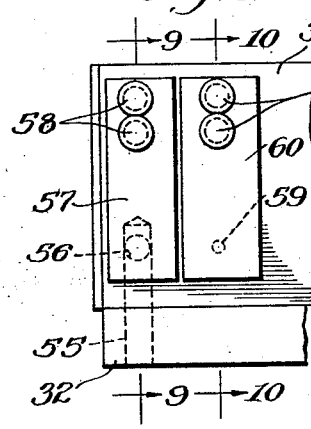
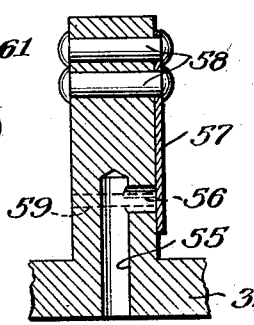
Inventor
Henry H. Logan May 24, 1932.   H. H. LOGAN   1,860,108
SHOCK ABSORBER
Filed Dec. 6, 1928   2 Sheets-Sheet 2
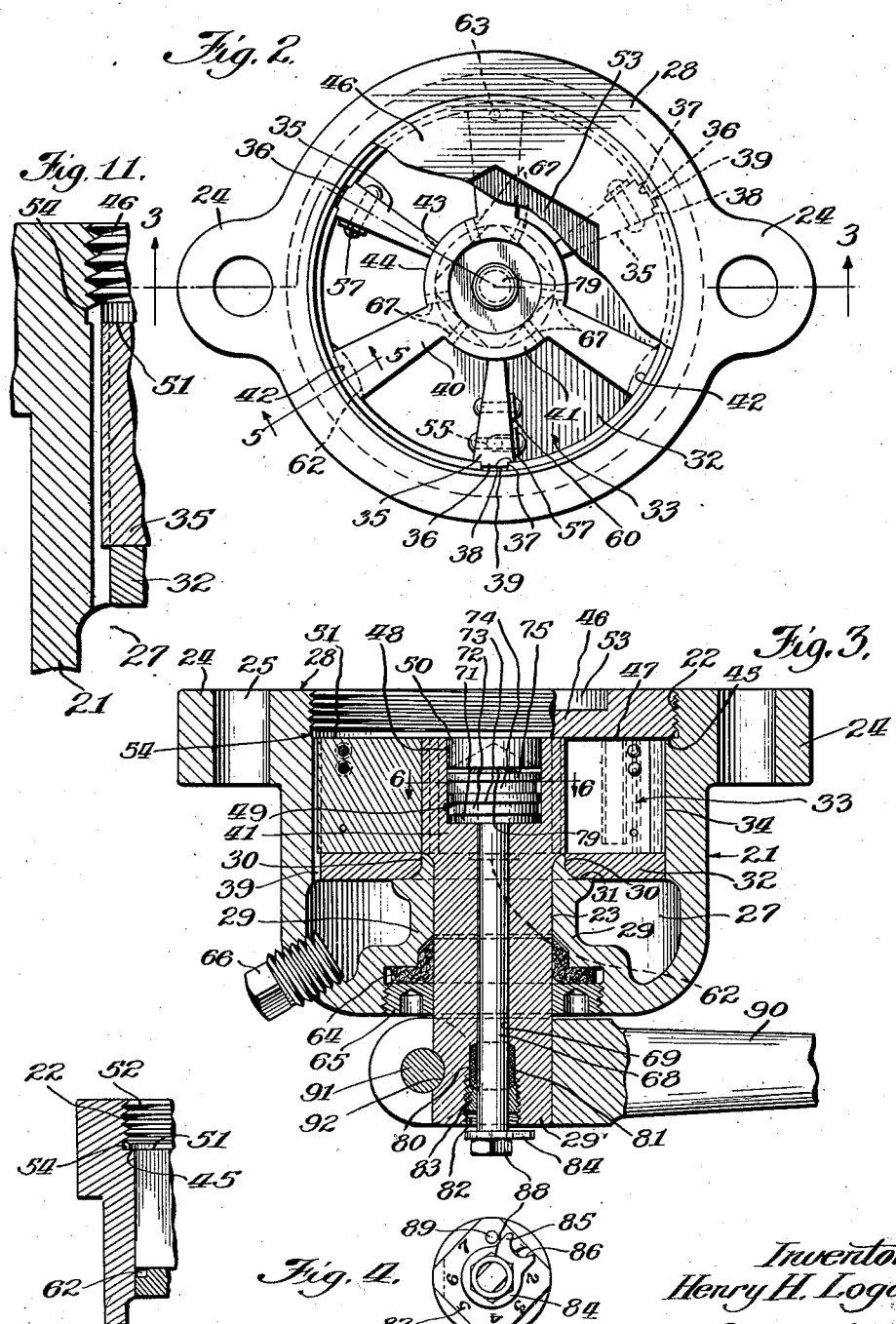
Inventor
Henry H. Logan
By Williams, Bradbury, McCaleb & Hinkle
attys.

Patented May 24, 1932

1,860,108

UNITED STATES PATENT OFFICE

HENRY H. LOGAN, OF CHICAGO, ILLINOIS

SHOCK ABSORBER

Application filed December 6, 1928. Serial No. 324,119.

The present invention relates to shock absorbers, and is particularly concerned with the provision of an improved hydraulic shock absorber.

One of the objects of the invention is the provision of an improved shock absorber casing, including cover means for closing said casing, and means for releasing the excessive pressure which would otherwise be built up in parts of said cover and for returning the leakage of hydraulic fluid to a reservoir.

Another object of the invention is the provision of a novel closure for shock absorber casings which does not require gaskets, and which eliminates any leakage of the hydraulic fluid by including means for the collection and return of the hydraulic fluid which leaks past the seating surface of said closure.

Another object is the provision of an improved form of an adjustable throttling mechanism for shock absorbers of the class described, which is more economically manufactured and assembled and which provides a wide range of extremely fine adjustment.

Another object is the provision of an improved commercial form of the shock absorber shown in my prior Patent No. 1,693,340 on shock absorbers, issued November 27, 1928, including novel forms of adjustment indicator and by-passes which simplify the manufacture of the device and decrease its cost of production.

Another object is the provision of a shock absorber casing of the class described, having leakage return conduits which are peculiarly simple and economically manufactured in this type of shock absorber, requiring substantially no additional labor or expense in their manufacture.

Other objects and advantages of the invention will be apparent from the following description and from the accompanying drawings in which similar characters of reference indicate similar parts throughout the several views.

Referring to the drawings, of which there are two sheets;

Fig. 1 is an elevational view of the shock absorber applied to an automotive vehicle;

Fig. 2 is a side elevational view of the shock absorber with a portion of the cover broken away to show the internal structure;

Fig. 3 is a sectional view taken on the line 3—3 of Fig. 2 looking in the direction of the arrows;

Fig. 4 is an end view of the shaft in Fig. 3, showing the indicator for the throttling adjustment;

Fig. 5 is a sectional view of a part of the shock absorber casing taken on the line 5—5 of Fig. 2 looking in the direction of the arrows;

Fig. 6 is an enlarged detail view of the throttling mechanism taken on the line 6—6 of Fig. 3 with the throttling mechanism in closed position;

Fig. 7 is a similar view with the throttling mechanism in open position;

Fig. 8 is an enlarged elevational view of a section of the partition and a fixed vane showing the hydraulic fluid feed valve and one of the one-way by-passes;

Fig. 9 is a sectional view taken on the line 9—9 of Fig. 8 looking in the direction of the arrows;

Fig. 10 is a sectional view taken on the line 10—10 of Fig. 9;

Fig. 11 is a detail sectional view of the shock absorber wall adjacent a fixed vane.

The present shock absorber is of the same general type as that shown in my prior patent, but includes novel features which cooperate with the various parts of the shock absorber in a novel manner, and I desire it to be understood that the use of the novel features of the present application is not limited to the specific construction of the shock absorber employed and many of the advantages of the invention may be realized by using some of the novel features herein set forth.

Referring to Figs. 1 to 3, 20 indicates in its entirety my shock absorber which is preferably provided with an integral cast metal casing 21 having an open end 22 and having a bearing 23 formed at the opposite end. The casing 21 may be of substantially cylindrical form having outwardly extending lugs 24 provided with apertures 25 for securing the casing to the chassis 26 of a vehicle, and the lugs 24 combined with the relatively flat annular outer edge 28 of the casing, provide a flat surface for engaging the chassis of a vehicle frame to prevent rocking of the shock absorber relative to the frame.

Many of the details of construction of the present embodiment may be exactly as disclosed in my prior patent above mentioned, and consequently the present disclosure will be devoted to features which are novel in this embodiment and details which differ in the improved commercial device.

The present embodiment also includes a reservoir 27 formed in one end of the casing 21 by the inwardly projecting annular flanges 29 which form the bearing 23. The annular flange 29 is provided with a reduced cylindrical portion 30 forming an annular shoulder 31 which is adapted to provide a support for a partition 32 which divides the casing 21 into the working chamber 33 and the reservoir 27. In the present embodiment, the working chamber 33 is provided with an interior cylindrical surface 34 which extends to the reservoir 27 and the shoulder 31 on the annular flange 29 acts as a stop member, determining the final position of the partition 32 which is pressed into a close frictional fit with the interior wall 34 of the casing 21.

The partition 32 carries a plurality of fixed vanes 35 extending radially of the circular partition 32 and the vanes 35 may be substantially wedge shape in plan, having a radially projecting portion 36 of reduced width extending outward beyond the outer edge of partition 32 for engagement in slots 37 formed in the casing 21. The projecting portions 36 of the fixed vanes 35 are slidably received in the slots 37, the rear edges 38 of the fixed vanes engaging the interior walls 34 of the casing 21 adjacent the slots 37, and the projecting portions 36 of the fixed vanes serve to locate the partition and vanes more accurately in the working chamber 33 and prevent any possibility of rotative movement of the fixed vanes.

In the present embodiment, the slots 37 which extend substantially parallel to the axis of the shock absorber have been made slightly deeper than the depth of the projecting portions 36 on the fixed vanes, thereby forming conduits 39 which extend from the top of the fixed vanes to the opposite side of the partition 32, communicating with the reservoir 27. In other words, the slots 37 extend past the partition 32 to reservoir 27 for a purpose further to be described.

The shaft 29 is adapted to be rotatably received in the bearing 23 and carries a plurality of movable vanes 40 extending radially from a hub 41. The vanes 40 may taper from their outer edges 42 toward the hub 41 in order to utilize all of the space between the fixed vanes 35, and the outer edges 42 of the vanes 40 are formed with a cylindrical surface machined to fit accurately within the cylindrical wall 34 of the casing 21. The inner edges 42 of the fixed vanes 35 are also formed with a concave cylindrical surface accurately machined to slidably engage the cylindrical surface 44 which forms the hub 41.

The upper edges (Fig. 3) of the fixed and movable vanes, as well as the hub 41 are substantially flat and aligned with an annular shoulder 45 formed in the casing 21, and the open end 22 of the casing is adapted to be closed by a cover 46 having a lower flat surface 47 adapted to engage the edges of the fixed and movable vanes and the end of the hub 41. The hub 41 may be formed with a bore 48 adapted to enclose a throttling mechanism indicated in its entirety at 49 and described in detail hereinafter. The bore 48 is also adapted to receive a complementary cylindrical lug 50 carried by the cover 46 and adapted to assist in the alignment of the shaft 29.

The casing 21 is slightly enlarged at its open end 22 forming an annular shoulder, or seating surface 45 which is adapted to cooperate with a complementary seating surface 51 carried by a cover 46. The open end 22 of the casing is threaded and cover 46 is provided with complementary threads 52 in such manner that a wrench or other appropriate tool may be placed in the non-circular socket 53 of cover 46, and the cover may be threaded into casing 21 until the seating surface 51 engages the seating surface 45 of the casing.

The cover 46 with the open end 22 of the casing is adapted to form a relatively small annular chamber or conduit 54 which is located inside the threads 52 of the cover and outside of the seating surfaces 45 and 51 relative to the working chamber 33. The chamber or conduit 54 is adapted to receive any leakage which may pass the seating surfaces 45 and 51 under the high pressure used in the working chamber 33, and the annular chamber 54 is so located that it is in communication with the conduits 39 formed by the bottom of the slots 37, which conduits 39 lead to the reservoir 27.

It should also be noted that one of the fixed vanes 35, specifically the bottom one in Fig. 2, is provided with a conduit 55 leading from the lower side (Fig. 3) of the partition 32 up to a transverse conduit 56 which extends to one side of the vane. The conduit 56 is normally maintained closed by a resilient metal leaf 57 which is secured to the fixed vane 35 by a plurality of rivets 58. The conduits 55 and 56 and the valve 57 are adapted to permit the replenishment of the supply of hydraulic fluid in the working chamber from the reserve supply which is maintained in the reservoir, substantially as described in my patent above mentioned.

Each of the fixed vanes 35 is provided with a one-way valved aperture which may consist of a hole 59 drilled through the fixed vane 35 from one side to the other and closed on one side by a resilient leaf 60 secured by a plurality of rivets 61. The one-way by-pass valves 60 are all located on the same side of the fixed vanes 35, and they permit the hydraulic fluid to pass through the fixed vanes in one direction, but prevent its return.

The working chamber 33 is also preferably provided with by-passes or leakage grooves 62 located at the medial points between the fixed vane 35 and adapted to automatically by-pass the hydraulic fluid when the movable vanes 40 are operating in normal position midway between the fixed vanes. The by-passes or leakage grooves 62 may be conveniently and economically formed by applying a milling cutter to the periphery of the partition 32 adjacent the upper edge or adjacent the face which forms the lower wall of the working chamber 33. The cutter will thus form a recess 62 which is curved in plan as shown in Fig. 2, and which is provided with a flat bottom as shown in Fig. 5, and the recesses 62 are tapered so as to permit a maximum by-pass of hydraulic fluid when the movable vanes are at the middle position.

The partition 32 is also provided with an air passage or bleeder 63 which may consist of an extremely small aperture, as for example, a one-thirty-second (1/32) inch hole located at the extreme upper edge of the partition 32 as shown in Fig. 2. The purpose of the air passage 63 is to permit the air to be automatically exhausted to the reservoir 27 and the passages located at the top of the shock absorber working chamber as installed in Fig. 1, since the bubbles in the hydraulic fluid will naturally find their way to the top.

The shaft 23 is preferably provided with a flanged packing 64 located in a counterbore and beveled to be automatically forced against the shaft 29 by any hydraulic fluid leaking through the bearing 23. The outer edge or flange of the packing 64 is clamped to the casing 21 by a gland 65 substantially as described in my patent. The reservoir is provided with a filling plug 66.

The present embodiment is preferably provided with a throttling mechanism substantially similar in operation to that disclosed in my prior patent, but the present throttling mechanism is adapted to be manufactured at a much lower cost and with considerably less labor. Each of the movable vanes is provided with a pair of by-passes 67 extending from the outside of the hub 44 to the bore 48 and the by-passes 67 are located one on each side of each movable vane 40. The throttling device indicated in its entirety at 49 comprises a rod 68 which is adapted to be rotatably received in a bore 69 extending axially of the shaft 29 and communicating with the bore 48. The rod 68 carries at its inner end in the bore 48 an assembly which forms a plurality of grooves 70 tapering in cross section, and each of the grooves 70 is adapted to register with a pair of by-passes 67 at the same time the other grooves 70 are registering with other by-passes 67. For this purpose, it is necessary to offset each pair of by-passes 67 axially of each other to register with their respective grooves 70.

The throttling mechanism 49 may be simply and economically constructed by building up the structure at its end of a plurality of metal plates 71, 72, 73, 74 and 75. The plates 71 and 75 comprise spacing members, and if desired, these spacing members may be made to fit accurately within the cylindrical bore 48 so as to form the outer wall of the grooves 70. The plates 72, 73 and 74 may comprise circular metal plates having a cylindrical outer edge 76 over a major portion of the periphery and having a portion cut away as at 70 to conform to the shape of the tapered grooves desired. The cutout 70 may extend over such portion of the periphery as desired, depending upon the fineness of adjustment desired, and in general, the longer the taper, the finer will be the adjustment. In the present embodiment, the cutout portion extends over substantially one-third of the periphery to simplify the description and illustration of the device. The grooves 70 for each particular pair of by-passes 67 need not necessarily be kept separated from every other groove, since all of the plates act simultaneously in throttling the by-passes 67, and it is immaterial whether hydraulic fluid leaks from one groove to another.

The plates 71 to 75 may be secured on the rod 68 by providing the rod with one or more flattened sides 77 adjacent its end, forming one or more shoulders 78 against which the plates 71 to 75 may rest. The assembly of plates may then be provided with apertures complementary to the flattened end 77 and the assembly may be secured on the rod by riveting over the end as at 79. The opposite end of the shaft 29 may be provided with a counterbore 80 adapted to receive a packing 81 and with a threaded counterbore 82 to receive a gland 83 substantially as described in my patent. The outer end of the rod 68 may be provided with a reduced non-circular portion adapted to receive a metal indicator plate 84 comprising a substantially circular metal plate having a pair of projecting pointers 85 forming a fork 86 adapted to embrace any one of a plurality of indicia 87.

The indicator plate 84 is secured to rod 68 by a nut 88 threaded on the reduced threaded end of the rod 68. The outer end of the shaft 29 is provided with a plurality of indicia 87 comprising numerals or other characters impressed in the end of the shaft at regularly spaced intervals on a circle about the rod 68.

The shaft may also be provided with a stop pin 89 to indicate the closed position of the throttling mechanism or to prevent the throttling mechanism from becoming entirely closed. The outer end of the shaft 29 is preferably non-circular and adapted to be received in a split-socket in the lever 90 which is provided with a bolt 91 extending transversely to its split end to clamp the lever on the shaft 29. The bolt 91 is preferably so located that it will engage in a groove 92 located in the shaft 29 so as to prevent positively axial movement of the lever 90 relative to the shaft 29 when the bolt 91 is in place.

The present shock absorber is preferably provided with three movable vanes and three fixed vanes as distinguished from the shock absorbers of the prior art, in which it has been customary to use but two movable vanes. The three movable vanes are adapted to automatically center and align the rotatable shaft at one end because three points determine the location of a circle, and consequently the location of its center. At the same time, by increasing the number of vanes, I am enabled to substantially reduce the pressure which is used in the shock absorber, to such an extent that the casing and other parts may be constructed of cast iron as distinguished from steel, which has been necessary in the prior art. The shock absorbers having a less number of vanes, require such a high pressure that the hydraulic fluid escapes through the pores of the cast iron and steel must be employed, since the hydraulic fluid would otherwise be lost by sweating of the shock absorber.

The working chambers are also of substantially greater width and depth than the working chambers of the prior art, and by the provision of three vanes and an increased area on the fixed and movable vanes, I am enabled to provide a shock absorber which will operate satisfactorily at a substantially reduced operating pressure.

This is a very important advantage as many of the difficulties involved in the manufacture and maintenance of hydraulic shock absorbers are caused by the excessively high pressures at which these shock absorbers must operate, and by the provision of a low pressure shock absorber I have eliminated difficulties resulting from leakage, and I am enabled to construct the parts of ordinary cast iron, thereby decreasing the cost of manufacture and maintenance.

The operation of my shock absorber is as follows.

The shock absorber being attached to the vehicle or axle, and connected by a connecting rod 93 to the other of these members, any relative movement between the axle 94 and the chassis 26 will produce a corresponding rotative movement of the shaft 29, the movable vanes 40 comprising the operating liquid on the side toward which they are moving, and forcing it through the restricted passages already described.

The general operation of the shock absorber is substantially as that described in my prior patent above mentioned, and the valved by-passes 59 permit movement of the shock absorber in one direction with relatively small resistance, but offer greater resistance to its movement in the other direction. The leakage grooves or by-passes 62 tend to permit free floating movement adjacent the middle of the normal range of operation, and the throttling device 49 provides an extremely fine adjustment for by-passing fluid around the movable vanes at all times.

The reservoir 27 provides a means for storing a reserve supply of hydraulic fluid which is fed to the working chambers through the valved conduits 55 and 56 and the air bubbles in the working chamber 33 are automatically exhausted by the air passage 63.

The cover 46 is adapted to provide a closure which will prevent any leakage of hydraulic fluid without the use of gaskets, and any leakage which does pass the seating surface provided on the cover 46 is collected in the conduit 54 and returned to the reservoir 27 through conduits 39. It will thus be observed that while the threaded portion of the cover is subjected to a thrust due to the hydrostatic pressure within the working chambers, there is practically no pressure tending to force the liquid past the threads, because of the fact that if any liquid should leak out of the working chambers past the working face of the cover, the pressure would immediately be relieved, by the liquid flowing around the annular groove 54, and back to the reservoir through the conduits. There would be no tendency to build up any pressure to force the liquid past the threads, and the only possible pressure tending to force the liquid past the threads would be that due to the hydrostatic head, due to the depth of liquid in the reservoir. Since the cover 46 is located directly over one end of the working chamber, it is possible to remove the cover and observe the working parts of the shock absorber in their proper relative position, and this is of great advantage in the repair and maintenance of hydraulic shock absorbers.

It will thus be observed that I have invented a novel shock absorber structure in which the casing is adapted to be closed effectively against leakage of any hydraulic fluid without the use of any gaskets, by means of the provision of return conduits for conducting any leakage back to the reserve reservoir. My shock absorber includes a novel throttling mechanism structure which is more effective in providing a fine adjustment and which is more economical and more easily manufactured than any of the throttling mechanisms of the prior art.

By providing a structure which can be constructed of ordinary cast iron, I have greatly decreased the cost of manufacture over shock absorbers of the prior art and by the elimination of gaskets for positioning the working parts, I have greatly decreased the difficulties of maintenance and repair.

All of the working parts of my shock absorber are readily accessible and the interior may be inspected by merely removing a single threaded member.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a hydraulic shock absorber, the combination of a casing with a partition forming a reservoir and a working chamber, a plurality of fixed vanes carried by said partition and engaging in slots in said casing, a closure having a leakage chamber, said slots forming conduits from said reservoir to said leakage chamber.

2. In a hydraulic shock absorber, the combination of a casing with a partition forming a reservoir and a working chamber, a plurality of fixed vanes carried by said partition and engaging in slots in said casing, a closure having a seating surface engaging said casing, threaded means for securing said closure in place, said casing having a leakage conduit formed outside said seating surface, said conduit communicating with said reservoir through one of said slots.

In witness whereof, I hereunto subscribe my name this 1st day of December, 1928.

HENRY H. LOGAN.